US011054518B2

(12) United States Patent
Hui et al.

(10) Patent No.: US 11,054,518 B2
(45) Date of Patent: Jul. 6, 2021

(54) METHOD AND APPARATUS FOR DETERMINING OBSTACLE SPEED (71) Applicant: Baidu Online Network Technology (Beijing) Co., Ltd., Beijing (CN)

(72) Inventors: Yujiang Hui, Beijing (CN); Jun Wang, Beijing (CN); Liang Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 330 days.

(21) Appl. No.: 16/026,328

(22) Filed: Jul. 3, 2018

(65) Prior Publication Data

US 2019/0011550 A1  Jan. 10, 2019

(30) Foreign Application Priority Data

Jul. 4, 2017 (CN) .......................... 201710538431.7

(51) Int. Cl.
*G01S 13/931* (2020.01)
*G06T 7/73* (2017.01)
(Continued)

(52) U.S. Cl.
CPC .............. *G01S 13/931* (2013.01); *G01P 3/50* (2013.01); *G01S 7/003* (2013.01); *G01S 13/588* (2013.01);
(Continued)

(58) Field of Classification Search
CPC .... G01S 13/931; G01S 13/588; G01S 13/589; G01S 13/865; G01S 13/66; G01S 13/72;
(Continued)

(56) References Cited

U.S. PATENT DOCUMENTS 8,718,919 B2 * 5/2014 Leineweber .......... G08G 1/165
701/301
8,989,944 B1 * 3/2015 Agarwal ............... G01S 13/589
701/23
(Continued)

FOREIGN PATENT DOCUMENTS

CN          103176185 A    6/2013
CN          106405555 A    2/2017
(Continued)

*Primary Examiner* — Erin F Heard
*Assistant Examiner* — Michael W Justice
(74) *Attorney, Agent, or Firm* — Knobbe, Martens, Olson & Bear LLP (57) ABSTRACT The disclosure discloses a method and apparatus for determining a speed of an obstacle. An embodiment of the method comprises: acquiring point cloud data and millimeter wave radar data of a driving environment of a vehicle; respectively processing the point cloud data and the millimeter wave radar data to determine speed information and location information of an obstacle in the driving environment; acquiring speed information of the vehicle; and integrating the speed information and the location information of the obstacle, and the speed information of the vehicle to determine the obstacle speed. The embodiment makes full use of point cloud data obtained by a laser radar and millimeter wave radar data obtained by a millimeter wave radar, and improves the accuracy in obstacle speed detection.

15 Claims, 6 Drawing Sheets (51) Int. Cl.
   *G01P 3/50* (2006.01)
   *G01S 13/86* (2006.01)
   *G01S 17/89* (2020.01)
   *G01S 7/00* (2006.01)
   *G01S 17/58* (2006.01)
   *G01S 13/58* (2006.01)
   *G01S 17/931* (2020.01)

(52) U.S. Cl.
   CPC ............ *G01S 13/865* (2013.01); *G01S 17/58* (2013.01); *G01S 17/89* (2013.01); *G01S 17/931* (2020.01); *G06T 7/73* (2017.01); *G06T 2207/10044* (2013.01); *G06T 2207/30261* (2013.01)

(58) Field of Classification Search
   CPC .... G01S 13/723; G01S 13/726; G01S 17/931; G01S 17/58; G01S 7/003; G01S 7/295; G01S 7/2955
   USPC ............ 342/70, 104, 107, 109, 113, 114, 54
   See application file for complete search history.

(56) References Cited

U.S. PATENT DOCUMENTS

| | | | | |
|---|---|---|---|---|
| 9,043,069 | B1* | 5/2015 | Ferguson | G05D 1/00 701/23 |
| 9,734,455 | B2* | 8/2017 | Levinson | G06K 9/00805 |
| 2013/0242284 | A1* | 9/2013 | Zeng | G01S 17/66 356/4.01 |
| 2014/0032012 | A1* | 1/2014 | Joshi | G05D 1/0274 701/1 |
| 2016/0018524 | A1* | 1/2016 | Zeng | G01S 17/931 356/4.01 |
| 2017/0146646 | A1* | 5/2017 | Nakabayashi | G01S 7/35 |
| 2017/0248693 | A1* | 8/2017 | Kim | G01S 13/42 |
| 2017/0307735 | A1* | 10/2017 | Rohani | G01S 7/417 |
| 2017/0316333 | A1* | 11/2017 | Levinson | G05D 1/0248 |
| 2018/0216942 | A1* | 8/2018 | Wang | G01S 17/89 |
| 2018/0239015 | A1* | 8/2018 | Nishida | B62D 15/025 |
| 2018/0273030 | A1* | 9/2018 | Weldon | G01S 17/931 |

FOREIGN PATENT DOCUMENTS

| | | |
|---|---|---|
| CN | 106708040 A | 5/2017 |
| CN | 206248832 U | 6/2017 |
| JP | 2002267751 A | 9/2002 |

* cited by examiner

METHOD AND APPARATUS FOR DETERMINING OBSTACLE SPEED

CROSS-REFERENCE TO RELATED APPLICATIONS

This application claims the benefit of Chinese Application No. 201710538431.7, filed on Jul. 4, 2017, titled "Method and Apparatus for Detecting Obstacle Speed," the entire disclosure of which is incorporated herein by reference.

TECHNICAL FIELD

The disclosure relates to the field of vehicle driving, specifically to the field of obstacle detection, and more specifically to a method and apparatus for determining a speed of an obstacle.

BACKGROUND

Millimeter wave radars and laser radars are widely used in the fields of autonomous driving and ADAS (advanced driver assistant system). The laser radar may sense precisely shape of an obstacle, while the millimeter wave radar may provide effective sensing data for the location and speed of the obstacle, and may overcome the interference caused by rain or snow. Because different sensors have their respective advantages, the safety of autonomous driving may be improved by effectively integrating the data of the sensors.

At present, the existing methods for detecting a speed of an obstacle generally rely on detection results of a laser radar or a millimeter wave radar, have large errors, and fail to accurately reflect the obstacle speed.

SUMMARY

An object of the disclosure includes providing a method and apparatus for determining a speed of an obstacle, to solve the technical problems mentioned in the background part.

In a first aspect, an embodiment of the disclosure provides a method for determining a speed of an obstacle. The method includes: acquiring point cloud data and millimeter wave radar data of a driving environment of a vehicle; respectively processing the point cloud data and the millimeter wave radar data to determine speed information and location information of an obstacle in the driving environment; acquiring speed information of the vehicle; and integrating the speed information and the location information of the obstacle, and the speed information of the vehicle to determine the obstacle speed.

In some embodiments, the respectively processing the point cloud data and the millimeter wave radar data includes: clustering and tracking the point cloud data to obtain first speed information and first location information of the obstacle, and a first obstacle identifier; and analyzing the millimeter wave radar data to obtain second speed information and second location information of the obstacle, and a second obstacle identifier.

In some embodiments, the second location information includes a distance between the obstacle and the vehicle and an angle between a line connecting the obstacle to the vehicle and the vehicle driving direction, and the second speed information includes a relative speed of the obstacle relative to the vehicle in a direction of the line; and the integrating the speed information and the location information of the obstacle, and the speed information of the vehicle to determine the obstacle speed includes: determining an absolute speed of the obstacle relative to the earth based on the vehicle speed information, the angle and the relative speed; converting the first speed information, the first location information, the absolute speed and the second location information into a same coordinate system based on a preset first conversion matrix and a preset second conversion matrix; matching the converted first speed information with the converted absolute speed based on a preset obstacle information integration list; and integrating the matched first speed information and the matched absolute speed.

In some embodiments, the first speed information and the first location information correspond to the first obstacle identifier, the absolute speed and the second location information correspond to the second obstacle identifier, and the obstacle information integration list includes a historical obstacle identifier, and historical speed information and historical location information corresponding to the historical obstacle identifier; and the matching the converted first speed information with the converted absolute speed based on a preset obstacle information integration list includes: determining whether the obstacle information integration list includes the first obstacle identifier and the second obstacle identifier based on the historical obstacle identifier, the first obstacle identifier and the second obstacle identifier; and updating the historical speed information and the historical location information corresponding to the first obstacle identifier using the first speed information and the first location information in response to the obstacle information integration list including the first obstacle identifier; and updating the historical speed information and the historical location information corresponding to the second obstacle identifier using the absolute speed and the second location information in response to the obstacle information integration list including the second obstacle identifier.

In some embodiments, the matching the converted first speed information with the converted absolute speed based on a preset obstacle information integration list includes: determining third location information based on the first location information, the first speed information and a time differential between a latest set of data in the point cloud data and a latest set of data in the millimeter wave radar data in response to the obstacle information integration list excluding the first obstacle identifier or the second obstacle identifier; determining a matching degree between the third location information and the converted second location information; and determining that the first obstacle identifier and the second obstacle identifier indicate a same obstacle, and updating the historical speed information and the historical location information corresponding to the first obstacle identifier based on the first speed information and the first location information, or updating the historical speed information and the historical location information corresponding to the second obstacle identifier based on the absolute speed and the second location information, in response to the matching degree being greater than or equal to a preset threshold.

In some embodiments, the matching the converted first speed information with the converted absolute speed based on a preset obstacle information integration list includes: adding the first location information, the first speed information and the first obstacle identifier or adding the absolute speed, the second location information and the second obstacle identifier to the obstacle information integration list, in response to the matching degree being lower than the preset threshold.

In some embodiments, the integrating the matched first speed information and the matched absolute speed includes: determining a moving direction of the obstacle in the driving environment based on the first location information; and integrating the moving direction and the absolute speed to determine the obstacle speed.

In some embodiments, the obstacle information integration list includes a moment of generating at least one of the historical location information or the historical speed information; and the method further includes: determining whether a time differential between the moment and the current moment is greater than a preset time length for each piece of at least one of the historical location information or the historical speed information in the obstacle information integration list; and deleting the piece of historical location information or the historical speed information in response to the time differential being greater than the preset time length.

In a second aspect, an embodiment of the disclosure provides an apparatus for determining a speed of an obstacle, including: a first acquisition unit, for acquiring point cloud data and millimeter wave radar data of a driving environment of a vehicle; a data processing unit, for respectively processing the point cloud data and the millimeter wave radar data to determine speed information and location information of an obstacle in the driving environment; a second acquisition unit, for acquiring speed information of the vehicle; and a speed integration unit, for integrating the speed information and the location information of the obstacle, and the speed information of the vehicle to determine the obstacle speed.

In some embodiments, the data processing unit is further configured to: cluster and track the point cloud data to obtain first speed information and first location information of the obstacle, and a first obstacle identifier; and analyze the millimeter wave radar data to obtain second speed information and second location information of the obstacle, and a second obstacle identifier.

In some embodiments, the first speed information and the first location information correspond to the first obstacle identifier, the absolute speed and the second location information correspond to the second obstacle identifier, and the obstacle information integration list includes a historical obstacle identifier, and historical speed information and historical location information corresponding to the historical obstacle identifier; and the speed matching module is further configured to: determine whether the obstacle information integration list includes the first obstacle identifier and the second obstacle identifier based on the historical obstacle identifier, the first obstacle identifier and the second obstacle identifier; and update the historical speed information and the historical location information corresponding to the first obstacle identifier using the first speed information and the first location information in response to the obstacle information integration list including the first obstacle identifier; and update the historical speed information and the historical location information corresponding to the second obstacle identifier using the absolute speed and the second location information in response to the obstacle information integration list including the second obstacle identifier.

In some embodiments, the speed matching module is further configured to: determine third location information based on the first location information, the first speed information and a time differential between a latest set of data in the point cloud data and a latest set of data in the millimeter wave radar data in response to the obstacle information integration list excluding the first obstacle identifier or the second obstacle identifier; determine a matching degree between the third location information and the converted second location information; and determine that the first obstacle identifier and the second obstacle identifier indicate a same obstacle, and update the historical speed information and the historical location information corresponding to the first obstacle identifier based on the first speed information and the first location information, or update the historical speed information and the historical location information corresponding to the second obstacle identifier based on the absolute speed and the second location information, in response to the matching degree being greater than or equal to a preset threshold.

In some embodiments, the speed matching module is further configured to: add the first location information, the first speed information and the first obstacle identifier or add the absolute speed, the second location information and the second obstacle identifier to the obstacle information integration list, in response to the matching degree being lower than the preset threshold.

In some embodiments, the speed integration module is further configured to: determine a moving direction of the obstacle in the driving environment based on the first location information; and integrate the moving direction and the absolute speed to determine the obstacle speed.

In some embodiments, the obstacle information integration list includes a moment of generating at least one of the historical location information or the historical speed information; and the apparatus further includes an information deletion unit. The information deletion unit is configured to: determine whether a time differential between the moment and the current moment is greater than a preset time length for each piece of at least one of the historical location information or the historical speed information in the obstacle information integration list; and delete the piece of the historical location information or the historical speed information in response to the time differential being greater than the preset time length.

In a third aspect, an embodiment of the disclosure provides an electronic device, including: one or more processors; and a memory, for storing one or more programs, where the one or more programs, when executed by the one or more processors, cause the one or more processors to execute the method according to any one of the embodiments.

In a fourth aspect, an embodiment of the disclosure provides a computer readable storage medium storing a computer program therein, wherein the program implements, when executed by a processor, the method according to any one of the embodiments.

In the method and apparatus for determining a speed of an obstacle according to the embodiments of the disclosure, after acquiring point cloud data and millimeter wave radar data, the point cloud data and the millimeter wave radar data are respectively processed to obtain speed information of an obstacle in a driving environment of a vehicle and location information of the obstacle relative to the vehicle; and the speed information and the location information of the obstacle, and the speed information of the vehicle are integrated to determine the obstacle speed. The method according to the embodiment makes full use of point cloud data obtained by a laser radar and millimeter wave radar data obtained by a millimeter wave radar, and improves the accuracy in obstacle speed detection.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
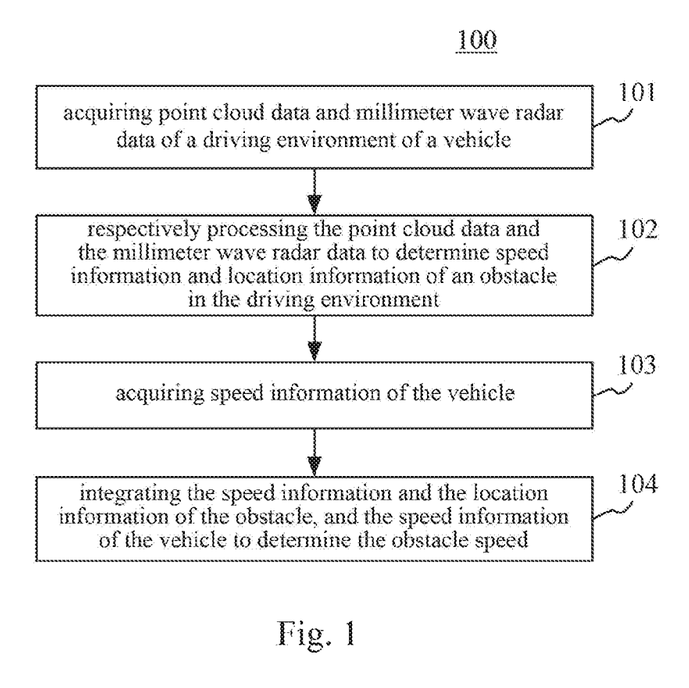
FIG. 1 is a process diagram of an embodiment of a method for determining a speed of an obstacle according to some embodiments of the disclosure.

FIG. 1 is a process 100 of a method for determining a speed of an obstacle according to some embodiments of the disclosure. The method for determining a speed of an obstacle according to the embodiment includes the following steps 101 to 104.

Step 101 includes: acquiring point cloud data and millimeter wave radar data of a driving environment of a vehicle.

In the embodiment, the point cloud data may be obtained from a laser radar, and the millimeter wave radar data may be obtained from a millimeter wave radar. The point cloud data and the millimeter wave radar data may include multiple sets of data. Each set of data is generated at a different moment, and includes information of an obstacle included in the driving environment of the vehicle. The laser radar and the millimeter wave radar may be installed on the vehicle, e.g., an unmanned vehicle or an autonomous driving vehicle. The obstacle may be other vehicles, pedestrians, or any object hindering the vehicle driving.

The method for determining a speed of an obstacle according to the embodiment is generally executed by a terminal or server, and the terminal or server may be in communication connection with the vehicle. The terminal or server may acquire the point cloud data and the millimeter wave radar data directly from a storage device connected to the sensors (laser radar or millimeter wave radar) of the vehicle or from locally stored data. As may be appreciated, when the method according to the embodiment is executed by the terminal, the terminal may be installed on the vehicle.

Figure 2:
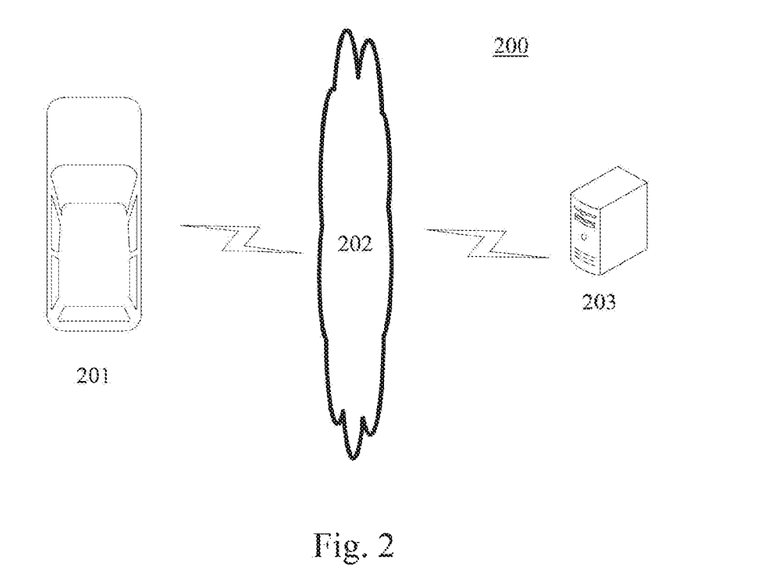
FIG. 2 is a structural diagram of an illustrative system applicable to some embodiments of the disclosure.

When the method according to the embodiment is executed by the server, the server needs to acquire the point cloud data and the millimeter wave radar data from the vehicle, and the corresponding system architecture diagram is shown in FIG. 2. As shown in FIG. 2, in some embodiments, the system architecture 200 may include a vehicle 201, a network 202 and a server 203. The network 202 is used for providing a communication link medium between the vehicle 201 and the server 203. The network 202 may include a variety of connection types, such as a wired communication link, a wireless communication link, or a fiber cable.

A laser radar and a millimeter wave radar may be installed on the vehicle 201 to collect point cloud data and millimeter wave radar data of the obstacle in the driving environment of the vehicle.

The server 203 may be a server that provides a variety of services, such as a backend server for processing the point cloud data and the millimeter wave radar data of the vehicle 201. The backend server may acquire the point cloud data and the millimeter wave radar data of the vehicle 201, and analyze the obstacle speed in the driving environment of the vehicle 201.

It should be noted that the method for determining a speed of an obstacle in an embodiment of the disclosure is generally executed by the server 203. Accordingly, the apparatus for determining a speed of an obstacle is generally set in the server 203.

It should be understood that the numbers of the vehicles, networks and servers in FIG. 2 are only illustrative. The numbers of terminal devices, networks and servers may be any other values based on implementation needs.

Referring to FIG. 1, in the step 102, the point cloud data and the millimeter wave radar data are respectively processed to determine speed information and location information of the obstacle in the driving environment.

In the embodiment, the point cloud data and the millimeter wave radar data, after being acquired, may be respectively processed to obtain speed information of the obstacle in the environment and location information of the obstacle relative to the vehicle. The point cloud data and the millimeter wave radar data may be processed identically or differently. For example, filtering processing may be performed on both the point cloud data and the millimeter wave radar data, or clustering may be performed on the point cloud data and the filtering processing is performed on the millimeter wave radar data. The speed information may include a speed of the obstacle relative to the vehicle, and may also include a speed of the obstacle relative to the earth. Likewise, the location information may include a location of the obstacle relative to the vehicle, and may also include a location of the obstacle relative to the earth.

In some optional implementations of the embodiment, the processing the point cloud data and the millimeter wave radar data in the step 102 may be implemented through the following steps that are not shown in FIG. 1: clustering and tracking the point cloud data to obtain first speed information and first location information of the obstacle, and a first obstacle identifier; and analyzing the millimeter wave radar data to obtain second speed information and second location information of the obstacle, and a second obstacle identifier.

In the implementation, first speed information and first location information of the obstacle, and a first obstacle identifier may be obtained by clustering (for splitting and classifying point cloud data to determine the obstacle in the driving environment) and tracking (for determining the location and speed of the detected obstacle) the point cloud data. The first obstacle identifier is used for distinguishing different obstacles detected by the laser radar. The millimeter wave radar data may be analyzed to obtain the second speed information and the second location information of the obstacle, and the second obstacle identifier. The second obstacle identifier is used for distinguishing different obstacles detected by the millimeter wave radar.

Step 103 includes: acquiring speed information of the vehicle.

In the embodiment, the speed information of the vehicle in the driving process may be further acquired, and the speed information is a speed of the vehicle relative to the earth.

Step 104 includes: integrating the speed information and the location information of the obstacle, and the speed information of the vehicle to determine the obstacle speed.

In the embodiment, the point cloud data and the millimeter wave radar data are processed to obtain the speed information and location information of the obstacle, and after the speed information of the vehicle is obtained, the above information may be integrated to determine the obstacle speed.

Figure 3:
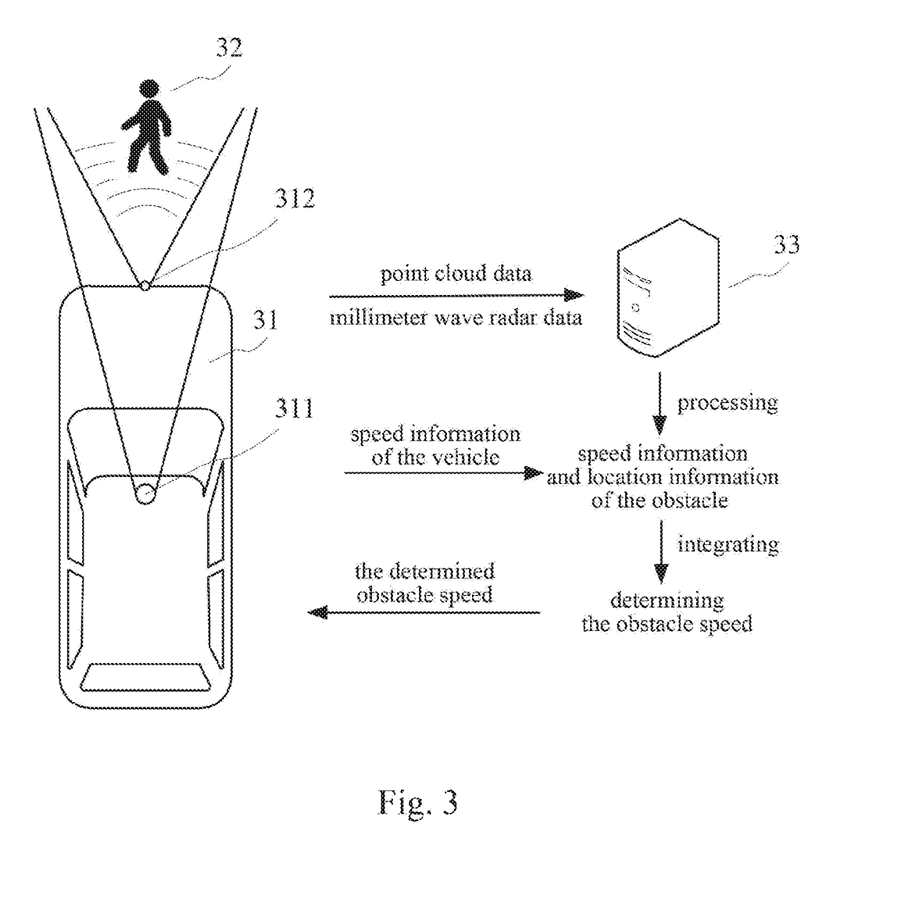
FIG. 3 is a schematic diagram of an application scenario of a method for determining a speed of an obstacle according to some embodiments of the disclosure.

By further referring to FIG. 3, FIG. 3 is a schematic diagram of an application scenario of a method for determining a speed of an obstacle according to some embodiments. In the application scenario in FIG. 3, a vehicle 31 is equipped with a laser radar 311 and a millimeter wave radar 312, where the laser radar 311 may obtain point cloud data by scanning the driving environment of the vehicle 31, and the millimeter wave radar 312 may obtain millimeter wave radar data. The vehicle 31 sends the point cloud data and the millimeter wave radar data to a server 33. The server 33 processes the data to obtain the speed information and the location information of the obstacle in a driving environment, acquire the speed information of the vehicle, and then integrates the speed information and location information of the obstacle and the information of the vehicle to determine the obstacle speed. Then the server 33 sends the determined obstacle speed to the vehicle 31. The vehicle 31 determines a pedestrian 32 in front of the vehicle and a speed of the pedestrian 32 by analyzing the information sent by the server 33, so as to formulate a driving strategy to avoid colliding with the pedestrian 32.

The method for determining a speed of an obstacle in the embodiments of the disclosure includes respectively processing, after acquiring the point cloud data and the millimeter wave radar data, the point cloud data and the millimeter wave radar data to obtain speed information of the obstacle in the driving environment of the vehicle and the location information of the obstacle relative to the vehicle; and integrating the speed information and the location information of the obstacle, and the speed information of the vehicle to determine the obstacle speed. In method according to the embodiment, the point cloud data obtained by the laser radar and millimeter wave radar data obtained by the millimeter wave radar are fully used, and the precision of detecting the obstacle speed is improved.

Figure 4:
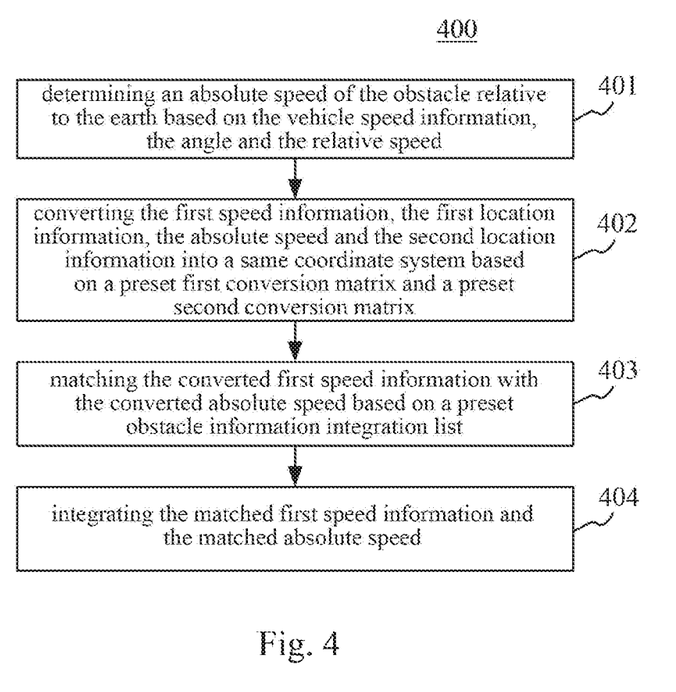
FIG. 4 is a process diagram of an embodiment of integrating speed information and location information of an obstacle, and speed information of a vehicle in a method for determining a speed of the obstacle according to some embodiments of the disclosure.

By further referring to FIG. 4, a process 400 of integrating speed information and location information of an obstacle, and speed information of a vehicle in a method for determining a speed of the obstacle according to some embodiments of the disclosure is shown. In an embodiment, the second location information obtained from the millimeter wave radar data may include a distance between the obstacle and the vehicle and an angle between a line connecting the obstacle to the vehicle and the vehicle driving direction; and the second speed information may include a relative speed of the obstacle relative to the vehicle in a direction of the line.

As shown in FIG. 4, in the embodiment, the integrating the speed information and the location information of the obstacle, and the speed information of the vehicle may include steps 401 to 404.

Step 401 includes: determining an absolute speed of the obstacle relative to the earth based on the vehicle speed information, the angle and the relative speed.

In the embodiment, the speed information of the vehicle includes the speed of the vehicle relative to the earth, and after determining the angle between a line connecting the obstacle to the vehicle and the vehicle driving direction and the speed of the obstacle relative to the vehicle, the absolute speed of the obstacle relative to the earth may be determined.

Step 402 includes: converting the first speed information, the first location information, the absolute speed and the second location information into a same coordinate system based on a preset first conversion matrix and a preset second conversion matrix.

In the embodiment, the first speed information and the first location information are obtained by processing the point cloud data, the point cloud data is collected by a laser radar, and then the first speed information and the first location information are based on a laser radar coordinate system. Similarly, the absolute speed and the second location information are based on a millimeter wave radar coordinate system. The speed information of the vehicle is based on a world coordinate system. When integrating the speed information and the location information of the obstacle, and the speed information of the vehicle, first the first speed information, the first location information, the absolute speed and the second location information need to be converted into a same coordinate system. That is, the first speed information, the first location information, the absolute speed and the second location information are all converted into the world coordinate system. The first conversion matrix may be a conversion matrix between the laser radar coordinate system and the world coordinate system, and the second conversion matrix may be a conversion matrix between the millimeter wave radar coordinate system and the world coordinate system.

Step 403 includes: matching the converted first speed information with the converted absolute speed based on a preset obstacle information integration list.

In the embodiment, after the speed information and the location information are converted into the same coordinate system, converted first speed information may be matched with the converted absolute speed based on the preset obstacle information integration list. The obstacle information integration list may include historical speed information and location information of the obstacle detected by the laser radar and the millimeter wave radar. The matching the converted first speed information and the converted absolute speed with the obstacle information integration list may be used not only to update the historical speed information and location information of the obstacle, but also to determine whether the converted first speed information and the converted absolute speed indicate a same obstacle.

In some optional implementations of the embodiment, the first moving information and the first location information correspond to the first obstacle identifier, the absolute speed and the second location information correspond to the second obstacle identifier, and the obstacle information integration list includes a historical obstacle identifier, and historical speed information and historical location information corresponding to the historical obstacle identifier. If the obstacle information integration list includes multiple historical obstacle identifiers, each of the historical obstacle identifiers corresponds to one piece of historical speed information and one piece of historical location information. Likewise, if there is multiple first obstacle identifiers, each of the first historical obstacle identifiers corresponds to one piece of first speed information and one piece of first location information. The step 403 may be achieved specifically through the following steps that are not shown in FIG. 4:

determining whether the obstacle information integration list includes the first obstacle identifier and the second obstacle identifier based on the historical obstacle identifier, the first obstacle identifier and the second obstacle identifier; and updating the historical speed information and the historical location information corresponding to the first obstacle identifier using the first speed information and the first location information in response to the obstacle information integration list including the first obstacle identifier; and updating the historical speed information and the historical location information corresponding to the second obstacle identifier using the absolute speed and the second location information in response to the obstacle information integration list including the second obstacle identifier.

The obstacle identifier is used for distinguishing different obstacles, that is, a single radar sensor associates different obstacles with different obstacle identifiers, and different radar sensors associates a same obstacle with different obstacle identifiers. In the implementation, whether the obstacle information integration list includes the first obstacle identifier and the second obstacle identifier may be determined based on the historical obstacle identifier, the first obstacle identifier and the second obstacle identifier. If obstacle information integration list includes the first obstacle identifier, an obstacle indicated by the first obstacle identifier is previously detected by the laser radar. In this case, the historical speed information and the historical location information corresponding to the first obstacle identifier in the obstacle information integration list are updated using the first speed information and the first location information corresponding to the first obstacle identifier. If the obstacle information integration list includes the second obstacle identifier, an obstacle indicated by the second obstacle identifier is previously detected by the millimeter wave radar. In this case, the historical speed information and the historical location information corresponding to the second obstacle identifier in the obstacle information integration list are updated using the absolute speed and the second location information corresponding to the second obstacle identifier.

In some optional implementations of the embodiment, the step 403 may further include the following steps that are not shown in FIG. 4:

determining third location information based on the first location information, the first speed information and a time differential between a latest set of data in the point cloud data and a latest set of data in the millimeter wave radar data in response to the obstacle information integration list excluding the first obstacle identifier or the second obstacle identifier; determining a matching degree between the third location information and converted second location information; and determining that the first obstacle identifier and the second obstacle identifier indicate a same obstacle, and updating the historical speed information and the historical location information corresponding to the first obstacle identifier based on the first speed information and the first location information, or updating the historical speed information and the historical location information corresponding to the second obstacle identifier based on the absolute speed and the second location information, in response to the matching degree being greater than or equal to a preset threshold.

When the obstacle information integration list excludes the first obstacle identifier or the second obstacle identifier, it is determined that the obstacle indicated by the first obstacle identifier is not previously detected by the laser radar, or the obstacle indicated by the second obstacle identifier is not previously detected by the millimeter wave radar. In this case, the third location information may be determined based on the first location information, the first speed information and a time differential between a latest set of data in the point cloud data and a latest set of data in the millimeter wave radar data. In the embodiment, the first location information may be a location corresponding to the latest set of data in the point cloud data, and the first speed information may be a speed corresponding to the set of data. In conjunction with the time differential, the location of the obstacle detected in the corresponding point cloud data at the moment of the latest set of data in the millimeter wave radar data, i.e., the third location information, may be obtained. Then a matching degree between the third location information and the converted second location information is calculated. The matching degree may be a distance between the third location information and the converted second location information, such as a Euclidean distance, a Manhattan distance or a Mahalanobis distance. It may be considered that the smaller the distance between two locations is, the higher the matching degree between the two locations is. The matching degree being greater than or equal to a preset threshold indicates that the first obstacle identifier and the second obstacle identifier indicate a same obstacle, and the historical speed information and the historical location information corresponding to the first obstacle identifier may be updated based on the first speed information and the first location information, or the historical speed information and the historical location information corresponding to the second obstacle identifier may be updated based on the absolute speed and the second location information.

In some optional implementations of the embodiment, the step 403 may further include the following steps that are not shown in FIG. 4:

adding the first location information, the first speed information and the first obstacle identifier or adding the absolute speed, the second location information and the second obstacle identifier to the obstacle information integration list, in response to the matching degree being lower than the preset threshold.

When the matching degree between the third location information and the converted second location information is lower than a preset threshold, it means that the obstacle indicated by the first obstacle identifier is a new obstacle, or the obstacle indicated by the second obstacle identifier is a new obstacle, then it is necessary to add the speed information and the location information corresponding to the excluded obstacle identifier to the obstacle information integration list. That is, if the obstacle information integration list excludes the first obstacle identifier, then the first speed information and the first location information are added; and if the obstacle information integration list excludes the second obstacle identifier, then the absolute speed and the second location information are added.

Step 404 includes: integrating the matched first speed information and the matched absolute speed.

After the conversion in the step 403, the previously detected obstacle and the new obstacle can be determined, i.e., the obstacle information may be accurately determined. Then the first speed information of the obstacle detected by the laser radar and the absolute speed of the obstacle detected by the millimeter wave radar are integrated, so that the speed of the obstacle may be determined more accurately.

In some optional implementations of the embodiment, the step 404 may be specifically implemented through the following steps that are not shown in FIG. 4:

determining a moving direction of the obstacle in the driving environment based on the first location information; and integrating the moving direction and the absolute speed to determine the obstacle speed.

In the implementation, the moving direction of the obstacle in the driving environment may be determined based on the first location information of the obstacle detected by the laser radar. Then the obstacle speed may be determined by integrating the moving direction and the absolute speed of the obstacle. Because the laser radar has a high precision in detecting the obstacle location, the implementation determines the actual moving direction of the obstacle using the location detected by the laser radar. Then the actual moving speed of the obstacle is precisely determined based on the absolute speed of the obstacle detected by the millimeter wave radar.

In some optional implementations of the embodiment, the obstacle information integration list includes a moment of generating at least one of location information speed information. The method may further include the following steps that are not shown in FIG. 4:

determining whether a time differential between the moment of generating at least one of location information or speed information and the current moment is greater than a preset time length for each piece of at least one of the historical location information or the historical speed information in the obstacle information integration list; and deleting the piece of historical location information or the historical speed information in response to the time differential being greater than the preset time length.

In the implementation, the at least one of the historical location information or the historical speed information corresponding to an "expired" historical obstacle identifier in the obstacle information integration list may be deleted in time. Based on the time differential between the moment of generating each piece of at least one of the historical location information or the historical speed information and the current moment, if the time differential is greater than the preset time length, the piece of the historical location information or the historical speed information is determined as "expired" information, and then the piece of the historical location information or the historical speed information may be deleted.

With the method for determining a speed of an obstacle provided by the embodiments of the disclosure, whether an obstacle is a historical obstacle can be accurately determined, so as to better and more accurately determine the obstacle speed by integrating the detection results of laser radar and millimeter wave radar.

Figure 5:
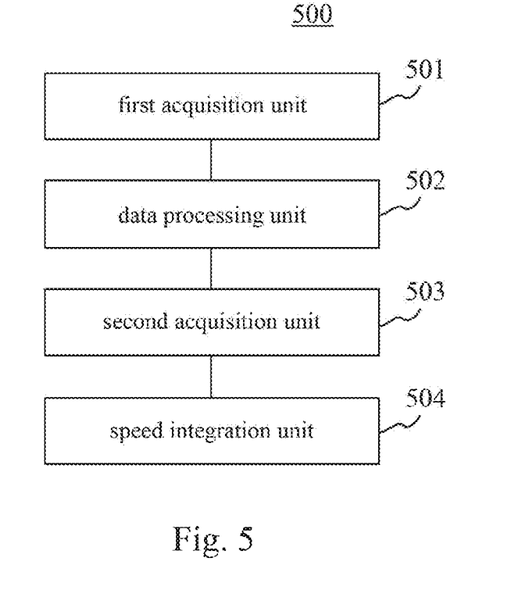
FIG. 5 is a schematic structural diagram of an embodiment of an apparatus for determining a speed of an obstacle according to some embodiments of the disclosure.

By further referring to FIG. 5, as implementations of the methods shown in the figures, the disclosure provides some embodiments of an apparatus for determining a speed of an obstacle. An embodiment of the apparatus corresponds to the embodiment of the method shown in FIG. 1, and the apparatus may be specifically applied to a variety of electronic devices.

As shown in FIG. 5, the apparatus 500 for determining a speed of an obstacle according to the embodiment may include:

a first acquisition unit 501, configured to acquire point cloud data and millimeter wave radar data of a driving environment of a vehicle;

a data processing unit 502, configured to respectively process the point cloud data and the millimeter wave radar data to determine speed information and location information of an obstacle in the driving environment;

a second acquisition unit 503, configured to acquire speed information of the vehicle; and a speed integration unit 504, configured to integrate the speed information and the location information of the obstacle, and the speed information of the vehicle to determine the obstacle speed.

In some optional implementations of the embodiment, the data processing unit 502 is further configured to: cluster and track the point cloud data to obtain first speed information and first location information of the obstacle, and a first obstacle identifier; and analyze the millimeter wave radar data to obtain second speed information and second location information of the obstacle, and a second obstacle identifier.

In some optional implementations of the embodiment, the second location information includes a distance between the obstacle and the vehicle and an angle between a line connecting the obstacle to the vehicle and the vehicle driving direction; and the second speed information includes a relative speed of the obstacle relative to the vehicle in a direction of the line. The speed integration unit 504 may further include an absolute speed determination module, a speed conversion module, a speed matching module and a speed integration module that are not shown in FIG. 5.

The absolute speed determination module is configured to determine an absolute speed of the obstacle relative to the earth based on the speed information of the vehicle, the angle and the relative speed.

The speed conversion module is configured to convert the first speed information, the first location information, the absolute speed and the second location information into a same coordinate system based on a preset first conversion matrix and a preset second conversion matrix.

The speed matching module is configured to match the converted first speed information with the converted absolute speed based on a preset obstacle information integration list.

The speed integration module is configured to integrate the matched first speed information and the matched absolute speed.

In some optional implementations of the embodiment, the first speed information and the first location information correspond to the first obstacle identifier, the absolute speed and the second location information correspond to the second obstacle identifier, and the obstacle information integration list includes a historical obstacle identifier, and historical speed information and historical location information corresponding to the historical obstacle identifier. The speed matching module may be further configured to: determine whether the obstacle information integration list includes the first obstacle identifier and the second obstacle identifier based on the historical obstacle identifier, the first obstacle identifier and the second obstacle identifier; and update the historical speed information and the historical location information corresponding to the first obstacle identifier using the first speed information and the first location information in response to the obstacle information integration list including the first obstacle identifier; and update the historical speed information and the historical location information corresponding to the second obstacle identifier using the absolute speed and the second location information in response to the obstacle information integration list including the second obstacle identifier.

In some optional implementations of the embodiment, the speed matching module may be further configured to: determine third location information based on the first location information, the first speed information and a time differential between a latest set of data in the point cloud data and a latest set of data in the millimeter wave radar data in response to the obstacle information integration list exclude the first obstacle identifier or the second obstacle identifier; determine a matching degree between the third location information and the converted second location information; and determine that the first obstacle identifier and the second obstacle identifier indicate a same obstacle, and update the historical speed information and the historical location information corresponding to the first obstacle identifier based on the first speed information and the first location information, or update the historical speed information and the historical location information corresponding to the second obstacle identifier based on the absolute speed and the second location information, in response to the matching degree being greater than or equal to a preset threshold.

In some optional implementations of the embodiment, the speed matching module may be further configured to: add the first location information, the first speed information and the first obstacle identifier or add the absolute speed, the second location information and the second obstacle identifier to the obstacle information integration list, in response to the matching degree being lower than the preset threshold.

In some optional implementations of the embodiment, the speed integration module may be further configured to: determine a moving direction of the obstacle in the driving environment based on the first location information; and integrate the moving direction and the absolute speed to determine the obstacle speed.

In some optional implementations of the embodiment, the obstacle information integration list includes a moment of generating at least one of historical location information or historical speed information. The apparatus further includes an information deletion unit. The information deletion unit is configured to: determine whether a time differential between the moment and the current moment is greater than a preset time length for each piece of at least one of the historical location information or the historical speed information in the obstacle information integration list; and delete the piece of the historical location information or the historical speed information in response to the time differential being greater than the preset time length.

The apparatus for determining a speed of an obstacle in the embodiments of the disclosure respectively processes, after acquiring point cloud data and millimeter wave radar data, the point cloud data and the millimeter wave radar data to obtain speed information of the obstacle in the driving environment of the vehicle and the location information of the obstacle relative to the vehicle; and integrates the speed information and the location information of the obstacle, and the speed information of the vehicle to determine the obstacle speed. The apparatus according to the embodiment makes full use of point cloud data obtained by a laser radar and millimeter wave radar data obtained by a millimeter wave radar, and improves the accuracy in obstacle speed detection.

It should be understood that the unit 501 to unit 504 included in the apparatus 500 for determining a speed of an obstacle respectively correspond to the steps in the method described in FIG. 1. Therefore, the operations and features described in the method for determining a speed of an obstacle is also applicable to the apparatus 500 and the units included therein, and are not repeated here. The corresponding units in the apparatus 500 may interact with the units in the terminal or server to implement the solutions of the embodiments of the disclosure.

Figure 6:
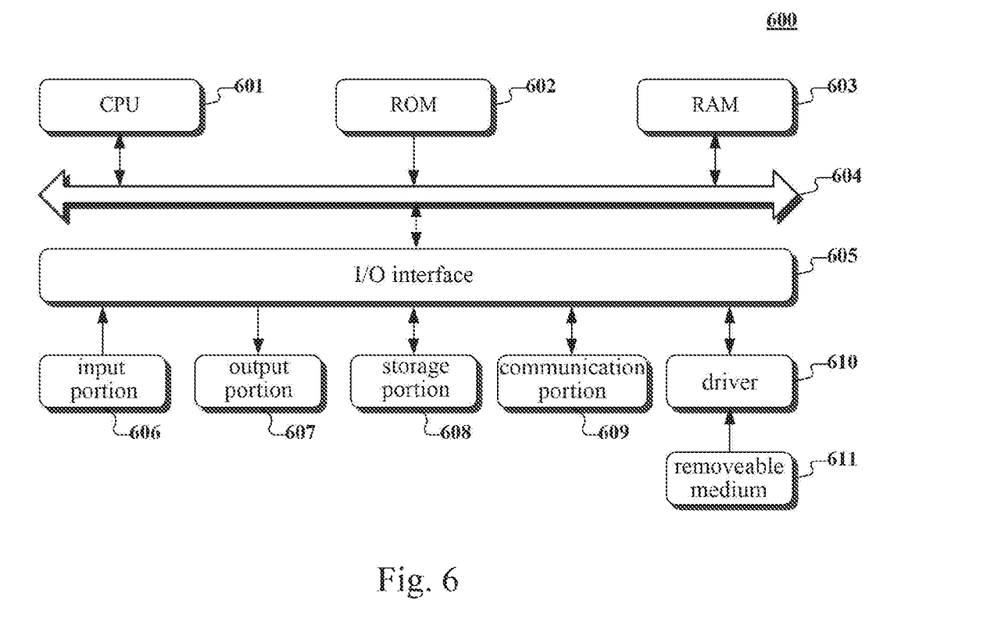
FIG. 6 is a schematic structural diagram of a computer system suitable for implementing a terminal device or a server according to some embodiments of the disclosure.

Referring to FIG. 6, a schematic structural diagram of a computer system 600 adapted to implement a terminal device and a server of some embodiments of the present disclosure is shown. The electronic device shown in FIG. 6 only is an example and should not be a limitation of the function and range of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is loaded in a computer-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units involved in the embodiments of the present disclosure may be implemented by means of software or hardware. The described units or modules may also be provided in a processor, for example, described as: a processor, comprising an obtaining unit, a data processing unit, a second acquiring unit and a speed integration unit, where the names of these units do not in some cases constitute a limitation to such units themselves. For example, the second acquiring unit may also be described as "a unit for acquiring speed information of the vehicle."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire point cloud data and millimeter wave radar data of a driving environment of a vehicle; respectively process the point cloud data and the millimeter wave radar data to determine speed information and location information of an obstacle in the driving environment; acquire speed information of the vehicle; and integrate the speed information and the location information of the obstacle, and the speed information of the vehicle to determine the obstacle speed.

The above description only provides an explanation of some embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for determining a speed of an obstacle, comprising:
   acquiring point cloud data and millimeter wave radar data of a driving environment of a vehicle;
   processing the point cloud data to determine first speed information and first location information of an obstacle in the driving environment, and processing the millimeter wave radar data to determine second speed information and second location information of the obstacle in the driving environment, wherein the second location information comprises a distance between the obstacle and the vehicle and an angle between a line connecting the obstacle to the vehicle and the vehicle driving direction, and the second speed information comprises a relative speed of the obstacle relative to the vehicle in a direction of the line;
   acquiring speed information of the vehicle;
   determining an absolute speed of the obstacle relative to the earth based on the vehicle speed information, the angle and the relative speed, wherein the absolute speed is based on a same coordinate system as the second location information;
   converting the first speed information, the first location information, the absolute speed and the second location information into a world coordinate system based on a preset first conversion matrix and a preset second conversion matrix;
   respectively matching the converted first speed information and the converted absolute speed with a preset obstacle information integration list; and
   using matched first location information and the matched absolute speed for determining the target speed of the obstacle,
   wherein the method is performed by at least one processor.

2. The method according to claim 1, wherein respectively processing the point cloud data and the millimeter wave radar data comprises:
   clustering and tracking the point cloud data to obtain the first speed information and the first location information of the obstacle, and a first obstacle identifier; and analyzing the millimeter wave radar data to obtain the second speed information and the second location information of the obstacle, and a second obstacle identifier.

3. The method according to claim 1, wherein the first speed information and the first location information correspond to the first obstacle identifier, the absolute speed and the second location information correspond to the second obstacle identifier, and the obstacle information integration list comprises a historical obstacle identifier, and historical speed information and historical location information corresponding to the historical obstacle identifier; and wherein respectively matching the converted first speed information and the converted absolute speed with the preset obstacle information integration list comprises:

determining that the obstacle information integration list comprises the first obstacle identifier and the second obstacle identifier based on the historical obstacle identifier, the first obstacle identifier and the second obstacle identifier;

updating the historical speed information and the historical location information corresponding to the first obstacle identifier using the first speed information and the first location information in response to the obstacle information integration list comprising the first obstacle identifier; and updating the historical speed information and the historical location information corresponding to the second obstacle identifier using the absolute speed and the second location information in response to the obstacle information integration list comprising the second obstacle identifier.

4. The method according to claim 3, wherein respectively matching the converted first speed information and the converted absolute speed with the preset obstacle information integration list further comprises:

determining third location information based on the first location information, the first speed information and a time differential between a latest set of data in the point cloud data and a latest set of data in the millimeter wave radar data in response to the obstacle information integration list excluding the first obstacle identifier or the second obstacle identifier;

determining a matching degree between the third location information and the converted second location information; and determining that the first obstacle identifier and the second obstacle identifier indicate a same obstacle, and updating the historical speed information and the historical location information corresponding to the first obstacle identifier based on the first speed information and the first location information, or updating the historical speed information and the historical location information corresponding to the second obstacle identifier based on the absolute speed and the second location information, in response to the matching degree being greater than or equal to a preset threshold.

5. The method according to claim 4, wherein respectively matching the converted first speed information and the converted absolute speed with the preset obstacle information integration list further comprises:

adding the first location information, the first speed information and the first obstacle identifier or adding the absolute speed, the second location information and the second obstacle identifier to the obstacle information integration list, in response to the matching degree being lower than the preset threshold.

6. The method according to claim 1, wherein using the matched first location information and the matched absolute speed for determining the target speed of the obstacle comprises:

determining a moving direction of the obstacle in the driving environment based on the first location information; and integrating the moving direction and the absolute speed to determine the target speed of the obstacle.

7. The method according to claim 1, wherein the obstacle information integration list comprises a moment of generating at least one of the historical location information or the historical speed information; and the method further comprises:

determining that a time differential between the moment and the current moment is greater than a preset time length for each piece of at least one of the historical location information or the historical speed information in the obstacle information integration list; and deleting the piece of the historical location information or the historical speed information in response to the time differential being greater than the preset time length.

8. An apparatus for determining a speed of an obstacle, comprising:

at least one processor; and a memory storing instructions, the instructions, when executed by the at least one processor, cause the at least one processor to perform operations, the operations comprising:

acquiring point cloud data and millimeter wave radar data of a driving environment of a vehicle;

processing the point cloud data to determine first speed information and first location information of an obstacle in the driving environment, and processing the millimeter wave radar data to determine second speed information and second location information of the obstacle in the driving environment, wherein the second location information comprises a distance between the obstacle and the vehicle and an angle between a line connecting the obstacle to the vehicle and the vehicle driving direction, and the second speed information comprises a relative speed of the obstacle relative to the vehicle in a direction of the line;

acquiring speed information of the vehicle;

determining an absolute speed of the obstacle relative to the earth based on the vehicle speed information, the angle and the relative speed, wherein the absolute speed is based on a same coordinate system as the second location information;

converting the first speed information, the first location information, the absolute speed and the second location information into a world coordinate system based on a preset first conversion matrix and a preset second conversion matrix;

respectively matching the converted first speed information and the converted absolute speed with a preset obstacle information integration list; and using matched first location information and the matched absolute speed for determining the target speed of the obstacle.

9. The apparatus according to claim 8, wherein respectively processing the point cloud data and the millimeter wave radar data comprises:

clustering and tracking the point cloud data to obtain the first speed information and the first location information of the obstacle, and a first obstacle identifier; and analyzing the millimeter wave radar data to obtain the second speed information and the second location information of the obstacle, and a second obstacle identifier.

10. The apparatus according to claim 8, wherein the first speed information and the first location information correspond to the first obstacle identifier, the absolute speed and the second location information correspond to the second obstacle identifier, and the obstacle information integration list comprises a historical obstacle identifier, and historical speed information and historical location information corresponding to the historical obstacle identifier; and wherein respectively matching the converted first speed information and the converted absolute speed with the preset obstacle information integration list comprises:
determining that the obstacle information integration list comprises the first obstacle identifier and the second obstacle identifier based on the historical obstacle identifier, the first obstacle identifier and the second obstacle identifier;
updating the historical speed information and the historical location information corresponding to the first obstacle identifier using the first speed information and the first location information in response to the obstacle information integration list comprising the first obstacle identifier; and
updating the historical speed information and the historical location information corresponding to the second obstacle identifier using the absolute speed and the second location information in response to the obstacle information integration list comprising the second obstacle identifier.

11. The apparatus according to claim 10, wherein respectively matching the converted first speed information and the converted absolute speed with the preset obstacle information integration list further comprises:
determining third location information based on the first location information, the first speed information and a time differential between a latest set of data in the point cloud data and a latest set of data in the millimeter wave radar data in response to the obstacle information integration list excluding the first obstacle identifier or the second obstacle identifier;
determining a matching degree between the third location information and the converted second location information; and
determining that the first obstacle identifier and the second obstacle identifier indicate a same obstacle, and updating the historical speed information and the historical location information corresponding to the first obstacle identifier based on the first speed information and the first location information, or updating the historical speed information and the historical location information corresponding to the second obstacle identifier based on the absolute speed and the second location information, in response to the matching degree being greater than or equal to a preset threshold.

12. The apparatus according to claim 11, wherein respectively matching the converted first speed information and the converted absolute speed with the preset obstacle information integration list further comprises:
adding the first location information, the first speed information and the first obstacle identifier or adding the absolute speed, the second location information and the second obstacle identifier to the obstacle information integration list, in response to the matching degree being lower than the preset threshold.

13. The apparatus according to claim 8, wherein using the matched first location information and the matched absolute speed for determining the target speed of the obstacle comprises:
determining a moving direction of the obstacle in the driving environment based on the first location information; and
integrating the moving direction and the absolute speed to determine the target speed of the obstacle.

14. The apparatus according to claim 8, wherein the obstacle information integration list comprises a moment of generating at least one of the historical location information and the historical speed information; and
the operations further comprise:
determining that a time differential between the moment and the current moment is greater than a preset time length for each piece of at least one of the historical location information or the historical speed information in the obstacle information integration list; and
deleting the piece of the historical location information or the historical speed information in response to the time differential being greater than the preset time length.

15. A non-transitory computer medium, storing a computer program therein, wherein the program, when executed by a processor, causes the processor to perform operations, the operations comprising:
acquiring point cloud data and millimeter wave radar data of a driving environment of a vehicle;
processing the point cloud data to determine first speed information and first location information of an obstacle in the driving environment, and processing the millimeter wave radar data to determine second speed information and second location information of the obstacle in the driving environment, wherein the second location information comprises a distance between the obstacle and the vehicle and an angle, between a line connecting the obstacle to the vehicle and the vehicle driving direction, and the second speed information comprises a relative speed of the obstacle relative to the vehicle in a direction of the line;
acquiring speed information of the vehicle; and
determining an absolute speed of the obstacle relative to the earth based on the vehicle speed information, the angle and the relative speed, wherein the absolute speed is based on a same coordinate system as the second location information;
converting, the first speed information, the first location information, the absolute speed and the second location information into a world coordinate system based on a preset first conversion matrix and a preset second conversion matrix;
respectively matching the converted first speed information and the converted absolute speed with a preset obstacle information integration list; and
using matched first location information and the matched absolute speed for determining the target speed of the obstacle.

* * * * *

UNITED STATES PATENT AND TRADEMARK OFFICE
CERTIFICATE OF CORRECTION

PATENT NO. : 11,054,518 B2  
APPLICATION NO. : 16/026328  
DATED : July 6, 2021  
INVENTOR(S) : Hui et al.

Page 1 of 1

It is certified that error appears in the above-identified patent and that said Letters Patent is hereby corrected as shown below:

In the Claims

In Column 20, Claim 15, Line 41, delete "angle," and insert --angle--.

In Column 20, Claim 15, Line 52, delete "converting," and insert --converting--.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*